United States Patent
Shin et al.

(10) Patent No.: US 9,754,403 B2
(45) Date of Patent: Sep. 5, 2017

(54) RAY TRACING UNIT AND METHOD FOR PROCESSING RAY DATA

(71) Applicant: Samsung Electronics Co., Ltd., Suwon-si (KR)

(72) Inventors: Young Sam Shin, Hwaseong-si (KR); Won Jong Lee, Seoul (KR); Jae Don Lee, Yongin-si (KR); Seok Joong Hwang, Seoul (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 105 days.

(21) Appl. No.: 14/642,837

(22) Filed: Mar. 10, 2015

(65) Prior Publication Data
US 2016/0071309 A1    Mar. 10, 2016

(30) Foreign Application Priority Data
Sep. 5, 2014    (KR) .......................... 10-2014-0119375

(51) Int. Cl.
| G06T 15/50 | (2011.01) |
| G06T 15/06 | (2011.01) |
| G06T 15/00 | (2011.01) |
| G06T 1/60  | (2006.01) |

(52) U.S. Cl.
CPC ............... *G06T 15/06* (2013.01); *G06T 1/60* (2013.01); *G06T 15/005* (2013.01); *G06T 2210/61* (2013.01)

(58) Field of Classification Search
None
See application file for complete search history.

(56) References Cited

U.S. PATENT DOCUMENTS

| 7,676,633 | B1 | 3/2010 | Fair et al. |
| 7,928,989 | B1 | 4/2011 | Brown et al. |
| 7,940,261 | B2 | 5/2011 | Wei et al. |
| 8,089,486 | B2 | 1/2012 | Anderson et al. |
| 2014/0063016 | A1* | 3/2014 | Howson .................. G06T 15/80 345/426 |
| 2015/0035854 | A1* | 2/2015 | Singh ..................... G06T 11/00 345/619 |

FOREIGN PATENT DOCUMENTS

KR    10-0196517 B1    2/1999

* cited by examiner

*Primary Examiner* — Xiao Wu
*Assistant Examiner* — Mohammad H Akhavannik
(74) *Attorney, Agent, or Firm* — F. Cha & Associates, LLC (57) ABSTRACT

A method of processing ray data the method including receiving ray data stored in input buffers; updating a property of the ray data based on a result of intersection traversal of the ray data; and outputting the ray data to an output buffer or to a feedback buffer from among the input buffers based on the updated property of the ray data. When there is insufficient space in the output buffer to store the ray data, outputting the ray data to the feedback buffer.

11 Claims, 11 Drawing Sheets

RAY TRACING UNIT AND METHOD FOR PROCESSING RAY DATA

CROSS-REFERENCE TO RELATED APPLICATION

This application claims the benefit under 35 USC 119(a) of Korean Patent Application No. 10-2014-0119375, filed on Sep. 5, 2014, in the Korean Intellectual Property Office, the entire disclosure of which is incorporated herein by reference for all purposes.

BACKGROUND

1. Field

The present disclosure relates to ray tracing units and methods for processing ray data.

2. Description of Related Art

Three-dimensional (3D) rendering refers to an image processing operation for synthesizing 3D object data into an image viewed from a viewpoint of a given camera. Ray tracing refers to an operation for tracing points at which scene objects to be rendered and rays intersect each other. The ray tracing includes traversal of an acceleration structure and intersection test between ray-primitives. Here, a large amount of computations and wide memory bandwidth are needed for the traversal and the intersection test.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, ray tracing units and methods of processing ray data for preventing a pipeline from being stalled are provided.

In another general aspect, ray tracing cores and methods of managing flows of ray data for preventing ray tracing units from being deadlocked are provided.

In yet another general aspect, non-transitory computer-readable recording media having recorded thereon computer programs for implementing the above-stated methods are provided.

Additional aspects will be set forth in part in the description which follows and, in part, will be apparent from the description, or may be learned by practice of the presented embodiments.

According to an aspect, a method for processing ray data includes receiving ray data stored in input buffers, updating a property of the ray data based on a result of intersection traversal of the ray data, and outputting the ray data to an output buffer or a feedback buffer from among the input buffers based on the updated property of the ray data, wherein, in the outputting of the ray data, in response to insufficient space in the output buffer to store the ray data, the ray data to be output to the output buffer is output to the feedback buffer.

Other features and aspects will be apparent from the following detailed description, the drawings, and the claims.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

Figure 1:
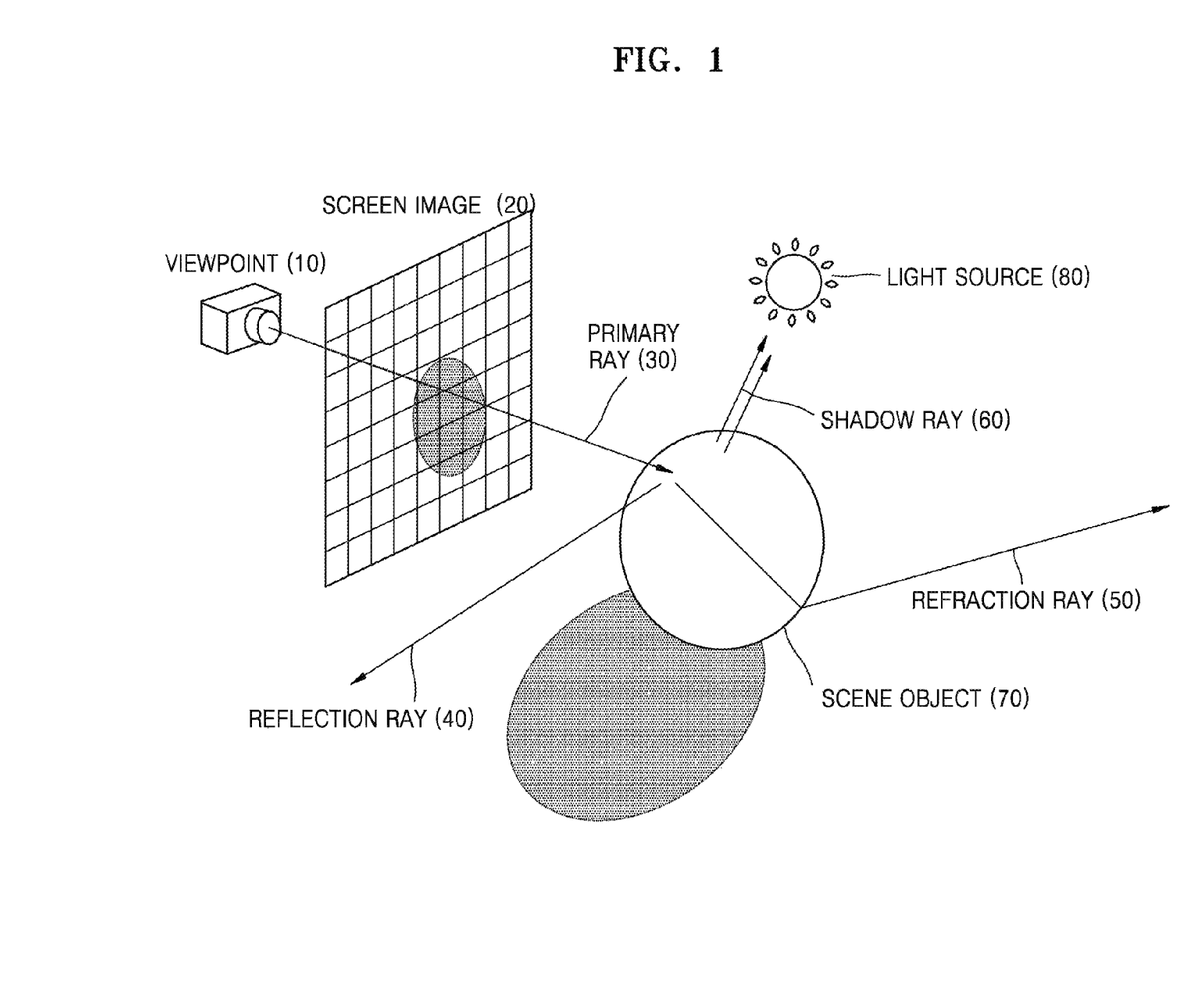
FIG. 1 is a diagram illustrating an example of ray tracing.

FIG. 1 is a diagram illustrating an example of ray tracing.

Referring to FIG. 1, in 3D modeling, a ray tracing core determines a viewpoint 10 and determines a screen image 20 based on the viewpoint 10. When the viewpoint 10 and the screen image 20 are determined, the ray tracing core generates a ray from the viewpoint 10 with respect to each pixel of the screen image 20.

To describe the configuration shown in FIG. 1, a primary ray 30 is generated from the viewpoint 10. The primary ray 30 passes through the screen image 20 and intersects with a scene object 70. At the intersection point between the primary ray 30 and the scene object 70, a reflection ray 40 and a refraction ray 50 are generated. Furthermore, a shadow ray 60 is generated from the intersection point toward a light source 80. Here, the reflection ray 40, the refraction ray 50, and the shadow ray 60 are referred to as secondary rays. The scene object 70 refers to an object that is to be rendered with respect to the screen image 20. The scene object 70 includes primitives.

The ray tracing core analyzes the primary ray 30, the secondary rays 40, 50, and 60, and rays derived from the secondary rays 40, 50, and 60. Based on a result of the analysis of the rays, the ray tracing core determines color values of pixels constituting the screen image 20. Here, the ray tracing core determines color values of pixels based on characteristics of the scene object 70.

Figure 2:
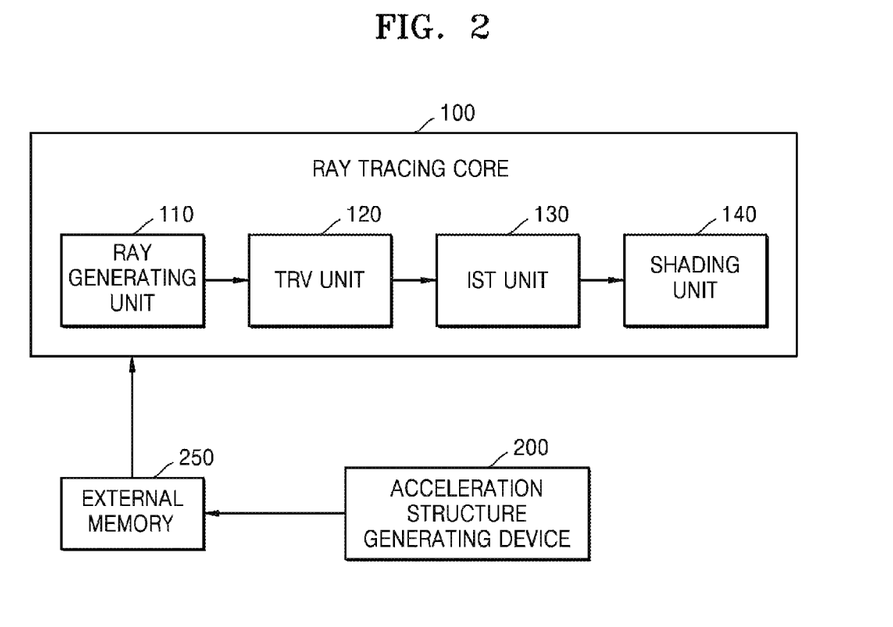
FIG. 2 is a diagram illustrating an example of a ray tracing core.

FIG. 2 is a diagram illustrating an example of a ray tracing core.

Referring to FIG. 2, the ray tracing core 100 includes a ray generating unit 110, a traversal (TRV) unit 120, an intersection (IST) unit 130, and a shading unit 140. Although FIG. 2 shows that the TRV unit 120 and the IST unit 130 are included in the ray tracing core 100, the TRV unit 120 and the IST unit 130 may be embodied as independent hardware. The components of the ray tracing core 100 shown in FIG. 2 are components related to the present embodiment. Therefore, one of ordinary skill in the art will understand that the ray tracing core 100 may further include general purpose components other than the components shown in FIG. 2.

The ray tracing core 100 traces intersection points between generated rays and objects located in a 3D space and determines color values of pixels constituting a screen image. In other words, the ray tracing core 100 finds intersection points between rays and objects, generates secondary rays based on the characteristics of the objects at the intersection points, and determines color values of the intersection points.

When the ray tracing core 100 performs acceleration structure traversal and an intersection test, the ray tracing core 100 uses a result of a previous acceleration structure traversal and a result of a previous intersection test. In other words, the ray tracing core 100 performs a current rendering faster than a previous rendering by applying the results of performances during a previous rendering.

The ray generating unit 110 generates a primary ray and secondary rays. The ray generating unit 110 generates a primary ray from a viewpoint and generates a reflection ray, a refraction ray, or a shadow ray at an intersection point between the primary ray and an object. The ray generating unit 110 also generates another primary ray at another intersection point between the primary ray and the object. The ray generating unit 110 generates a reflection ray, a refraction ray, and a shadow ray within a set number of times. Alternatively, the ray generating unit 110 determines the number of times for generating a reflection ray, a refraction ray, and a shadow ray based on a characteristics of an object.

The TRV unit 120 generates information regarding generated rays from the ray generating unit 110. The generated rays include a primary ray, secondary rays, and all rays derived from the secondary rays. For example, in the case of the primary ray, the TRV unit 120 receives information regarding a viewpoint and a direction of the generated ray. Furthermore, in the case of a primary ray, the TRV unit 120 receives information regarding a starting point and a direction of the secondary ray. A starting point of the secondary ray indicates a point hit by a primary ray. A viewpoint or a starting point is expressed as coordinates, whereas a direction is expressed as a vector.

The TRV unit 120 reads out information regarding an acceleration structure from an external memory 250. An acceleration structure is generated by an acceleration structure generating device 200, and the generated acceleration structure is stored in the external memory 250. An acceleration structure refers to a structure including information regarding coordinates of objects in a 3D space. For example, K-Dimensional tree (KD-tree) or Bounding Volume Hierarchy (BVH) is applied to an acceleration structure but is not limited thereto.

The TRV unit 120 traverses an acceleration structure and outputs an object or a leaf node hit by a ray. For example, the TRV unit 120 traverses nodes included in an acceleration structure and outputs bottom leaf nodes hit by rays from among leaf nodes, to the IST unit 130. In other words, the TRV unit 120 determines which of bounding boxes constituting an acceleration structure is hit by a ray and which of objects included in the hit bounding box is hit by the ray. A bounding box denotes a unit including objects or primitives and is expressed in different forms based on acceleration structures. A TRV cache refers to a memory for temporarily storing data used by the TRV unit 120 during a traversal.

The TRV unit 120 traverses an acceleration structure by using a result of a previous rendering. Based on a result of a previous rendering stored in a TRV cache, the TRV unit 120 traverses an acceleration structure along a same path as used in the previous rendering. For example, when the TRV unit 120 traverses an acceleration structure regarding an input ray, the TRV unit 120 primarily performs a traversal regarding a bounding box hit by a previous ray having a same viewpoint and a direction as the input ray. Furthermore, the TRV unit 120 traverses an acceleration structure with reference to a traversal path regarding the previous ray The IST unit 130 receives an object or a leaf node hit by a ray from the TRV unit 120 and reads out information regarding primitives included in the hit object from the external memory 250. The read-out information regarding primitives is stored in an IST cache. An IST cache refers to a memory for temporarily storing data used by the IST unit 130 during an intersection test but is not limited thereto. That is, the IST cache can store other types of data.

The IST unit 130 performs an intersection test between a ray and primitives and outputs a primitive hit by the ray and an intersection point. The IST unit 130, which received information indicating an object hit by a ray from the TRV unit 120, checks which of primitives included in the hit object is hit by the ray. After a primitive hit by the ray is found, the IST unit 130 outputs an intersection point indicating which portion of the hit primitive and the ray intersect each other. The intersection point is output to the shading unit 140 in the form of coordinates.

The IST unit 130 performs an intersection test by using a result of a previous rendering. In other words, the IST unit 130 primarily performs an intersection test with respect to a primitive that is identical to that of a previous rendering by using a result of the previous rendering stored in an IST cache. For example, when an intersection test between an input ray and primitives is performed, the IST unit 130 performs an intersection test with respect to a primitive hit by a previous ray having same or similar viewpoint and direction as those of an input ray.

The shading unit 140 determines a color value of a pixel based on information regarding an intersection point and material properties at the intersection point that is received from the IST unit 130. The shading unit 140 determines a color value of a pixel based on the default material color at the intersection point and effects due to a light source but is not limited thereto. That is, the determination of the color value of the pixel can be based on other factors.

The ray tracing core 100 receives data for performing ray tracing from the external memory 250. The external memory 250 stores geometry data indicating a generated acceleration structure or primitives but is not limited thereto. That is, the external memory 250 may store data other than geometry data. A primitive has a polygonal shape, such as a triangular shape or a rectangular shape but is not limited thereto, where geometry data may indicate information regarding vertexes and locations of primitives included in an object.

The acceleration structure generating device 200 generates an acceleration structure including information regarding locations of objects in a 3D space. The acceleration structure generating device 200 generates acceleration structures of various forms. For example, an acceleration structure has a structure of a 3D space divided into a hierarchical tree, where the acceleration structure generating device 200 generates an acceleration structure indicating relationships between objects in a 3D space by applying bounding volume hierarchies (BVH) or a KD-tree. The acceleration structure generating device 200 determines the maximum number of primitives of a leaf node and a tree depth and generates an acceleration structure based on the determination.

Figure 3:
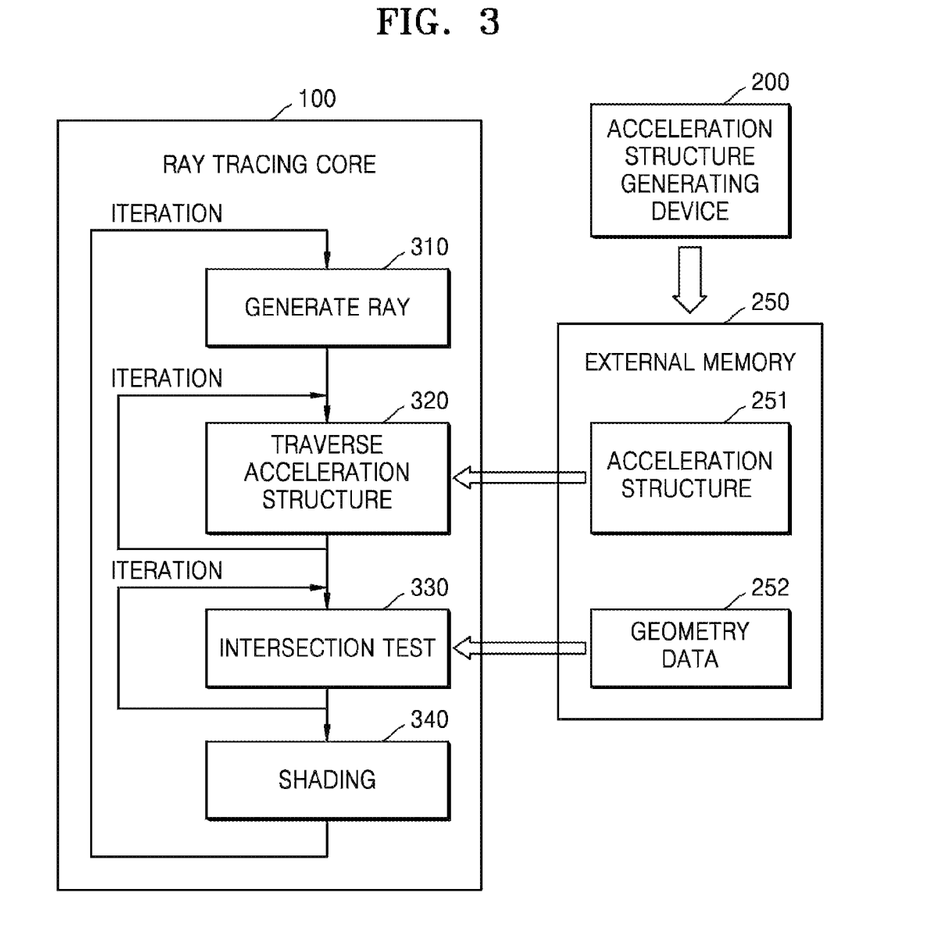
FIG. 3 is a diagram illustrating an example of a ray tracing core performing ray tracing.

FIG. 3 is a diagram illustrating an example of a ray tracing core performs ray tracing. The ray tracing core has the structure of the ray tracing core 100 shown in FIG. 2. Therefore, even if omitted below, descriptions of the ray tracing core 100 above also apply to the ray tracing method of FIG. 3.

In operation 310, the ray tracing core 100 generates rays. The ray tracing core 100 generates a primary ray, secondary rays, and rays derived from the secondary rays but is not limited thereto.

In operation 320, the ray tracing core 100 traverses an acceleration structure read out from the external memory 250. The ray tracing core 100 detects a bounding box hit by a ray by traversing an acceleration structure 251 based on viewpoints and directions of generated rays and detects an object hit by the rays from among objects included in the hit bounding box. The ray tracing core 100 repeatedly traverses the acceleration structure 251 until a hit object is detected. For example, the ray tracing core 100 traverses an acceleration structure along an arbitrary path, and, if no leaf node on the traversed path is hit by a ray, the ray tracing core 100 traverses the acceleration structure along another path.

For example, the ray tracing core 100 sequentially traverse all paths. However, the ray tracing core 100 primarily traverses a particular path based on traversal information of a previous ray. For example, if a viewpoint and a direction of a previous ray are identical or similar to those of a current ray, the ray tracing core 100 primarily traverses a path including a leaf node hit by a previous ray.

In operation 330, the ray tracing core 100 performs an intersection test. The ray tracing core 100 performs an intersection test based on geometry data 252 of primitives read out from the external memory 250. The ray tracing core 100 repeatedly performs intersection tests until a hit primitive is detected. For example, the ray tracing core 100 performs an intersection test with respect to an arbitrary primitive and, if the primitive is not hit by a ray, performs an intersection test with respect to another primitive.

Although the ray tracing core 100 sequentially performs intersection tests with respect to all primitives, the ray tracing core 100 primarily performs an intersection test with respect to a particular primitive based on information regarding intersection tests with respect to a previous ray. For example, if a previous ray and a current ray have a same viewpoint and a same direction, the ray tracing core 100 primarily performs an intersection test with respect to a primitive hit by the previous ray.

In operation 340, the ray tracing core 100 shades pixels based on a result of the intersection test. When operation 340 is completed, the ray tracing core 100 proceeds back to operation 310. The ray tracing core 100 repeatedly performs operations 310 through 340 with respect to all pixels constituting a screen image.

Figure 4:
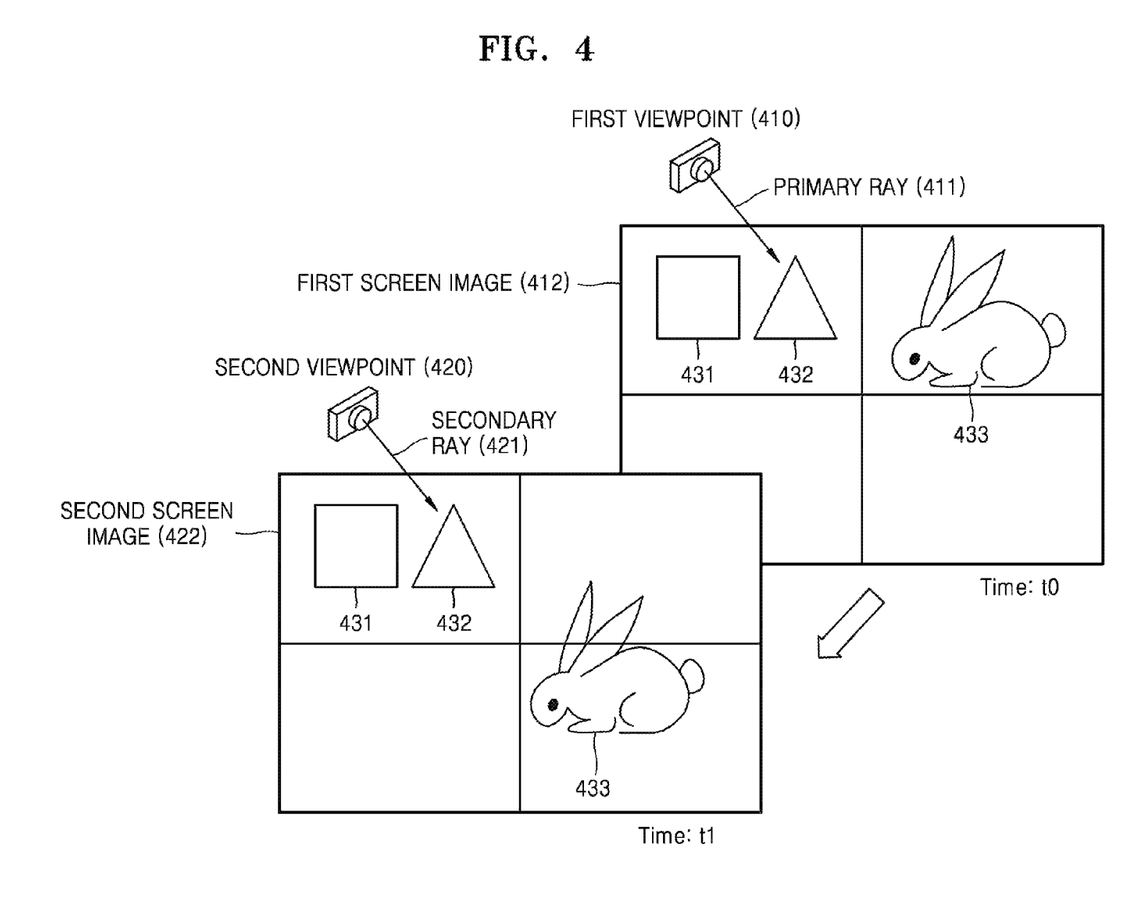
FIG. 4 is a diagram illustrating an example of a method of accelerating ray tracing.

FIG. 4 is a diagram illustrating an example of a method of accelerating ray tracing. Referring to FIG. 4, a first screen image 412 indicates a screen image rendered when t=0, whereas a second screen image 422 indicates a screen image rendered when t=1. Since only a rabbit 433 moves and a rectangle 431 and a triangle 432 do not move in the first screen image 412 and the second screen image 422, the first screen image 412 and the second screen image 422 are almost identical to each other. Therefore, the ray tracing core 100 renders the second screen image 422 by using a result of rendering the first screen image 412. For example, if a location of a first viewpoint 410 is identical to that of a second viewpoint 420 and a direction of a primary ray 411 is identical to that of a secondary ray 421, the ray tracing core 100 accelerates ray tracing of the secondary ray 421 by applying a result of performing ray tracing with respect to the primary ray 411 to the ray tracing of the secondary ray 421. For example, when the TRV unit 120 of the ray tracing core 100 performs traversal with respect to the secondary ray 421, the TRV unit 120 primarily traverses a bounding box hit by the primary ray 411. Furthermore, when the IST unit 130 of the ray tracing core 100 performs an intersection test with respect to the secondary ray 421, the IST unit 130 primarily performs an intersection test with respect to the triangle 432 hit by the primary ray 411.

Figure 5:
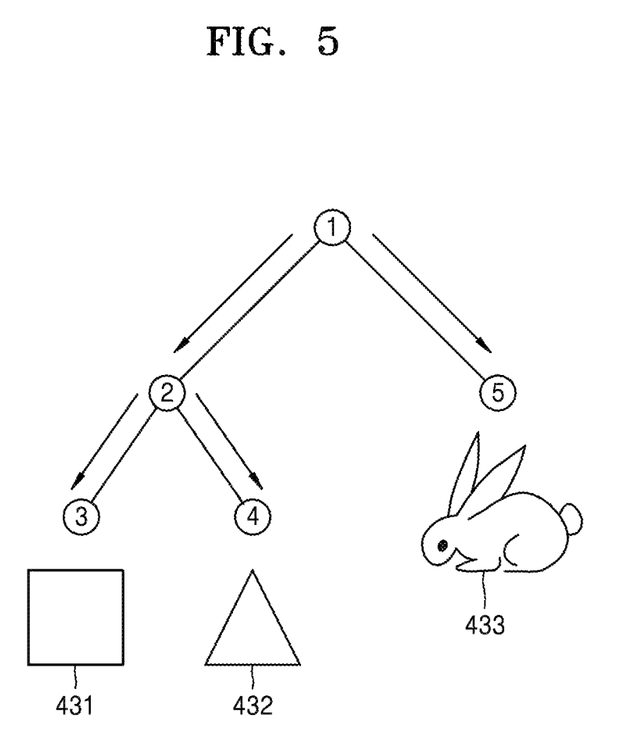
FIG. 5 is a diagram illustrating an example of the method of accelerating ray tracing of FIG. 4.

FIG. 5 is a diagram illustrating an example of the method of accelerating ray tracing of FIG. 4. Referring to FIG. 5, an acceleration structure includes five nodes, that is, a first through fifth node, where a third node and a fifth node indicate leaf nodes.

The TRV unit 120 traverses the acceleration structure along three paths. First, the TRV unit 120 traverses the acceleration structure along a first path including a first node, a second node, and the third node. Second, the TRV unit 120 traverses the acceleration structure along a second path including the first node, the second node, and a fourth node. Third, the TRV unit 120 traverses the acceleration structure along a third path including the first node and the fifth node. However, it is noted that the traversal of the acceleration structure is not limited to the above described three paths and more or less paths may be used as well as different path sequences. Here, when the TRV unit 120 performs traversal with respect to the secondary ray 421, the TRV unit 120 primarily traverses along the second path for traversing the triangle 432 hit by the primary ray 411. Therefore, the traversal of the TRV unit 120 along the first path or the third path may be omitted.

Figure 6:
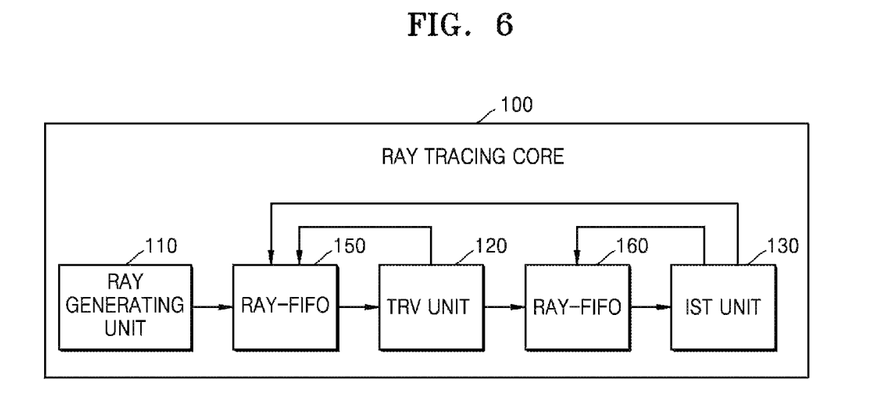
FIG. 6 is a diagram illustrating another example of a ray tracing core.

FIG. 6 is a diagram illustrating another example of a ray tracing core. Referring to FIG. 6, the ray tracing core 100 includes RAY-FIFOs 150 and 160, the TRV unit 120, and the IST unit 130. The TRV unit 120 or the IST unit 130 refers to a ray tracing unit. Although FIG. 6 shows the RAY-FIFOs 150 and 160, the TRV unit 120, the IST unit 130, and the ray generating unit 110 included in the ray tracing core 100, the RAY-FIFOs 150 and 160, the TRV unit 120, the IST unit 130, and the ray generating unit 110 may be embodied as independent hardware.

The RAY-FIFOs 150 and 160 are buffers or memories for storing ray data but are not limited thereto and may store other types of data. The RAY-FIFOs 150 and 160 output ray data in the order the ray data is input. The RAY-FIFO 150 functions as an input buffer for storing ray data input to the TRV unit 120. The RAY-FIFO 160 functions as an output buffer for storing ray data output by the TRV unit 120. Furthermore, the RAY-FIFO 160 also functions as an input buffer for storing ray data input to the IST unit 130.

The TRV unit 120 outputs ray data to the RAY-FIFOs 150 and 160. The IST unit 130 also outputs ray data to the RAY-FIFOs 150 and 160.

The RAY-FIFO 150 stores ray data received from the ray generating unit 110, ray data received from the TRV unit 120, and ray data received from the IST unit 130 separately.

The RAY-FIFO 160 stores ray data received from the TRV unit 120 and ray data received from the IST unit 130 separately.

The TRV unit 120 outputs ray data to the RAY-FIFO 160 to the RAY-FIFO 150. If there is not enough space in the RAY-FIFO 160 to store ray data, the TRV unit 120 outputs ray data to the RAY-FIFO 150, thereby preventing the TRV unit 120 from being stalled. Here, the TRV unit 120 changes properties of ray data and outputs ray data to the RAY-FIFO 150. In detail, the TRV unit 120 changes a property of ray data to a bypass property.

If ray data has a bypass property, the TRY unit 120 does not traverse with respect to the ray data. In other words, the TRV unit 120 uses a pipeline as a buffer with respect to the ray data having a bypass property and does not perform any computation.

When ray data having a bypass property is output from a pipeline, the TRV unit 120 checks whether the RAY-FIFO 160 stores ray data. If the RAY-FIFO 160 stores ray data, the TRV unit 120 changes the ray data having a bypass property into data ray having an IST RAY property and outputs the ray data to the RAY-FIFO 160. Ray data including IST property refers to ray data for receiving an intersection test at the IST unit 130.

Properties of ray data are categorized via fields defining types of rays. In other words, a type of a ray is determined based on a value of a particular parameter of ray data.

Figure 7:
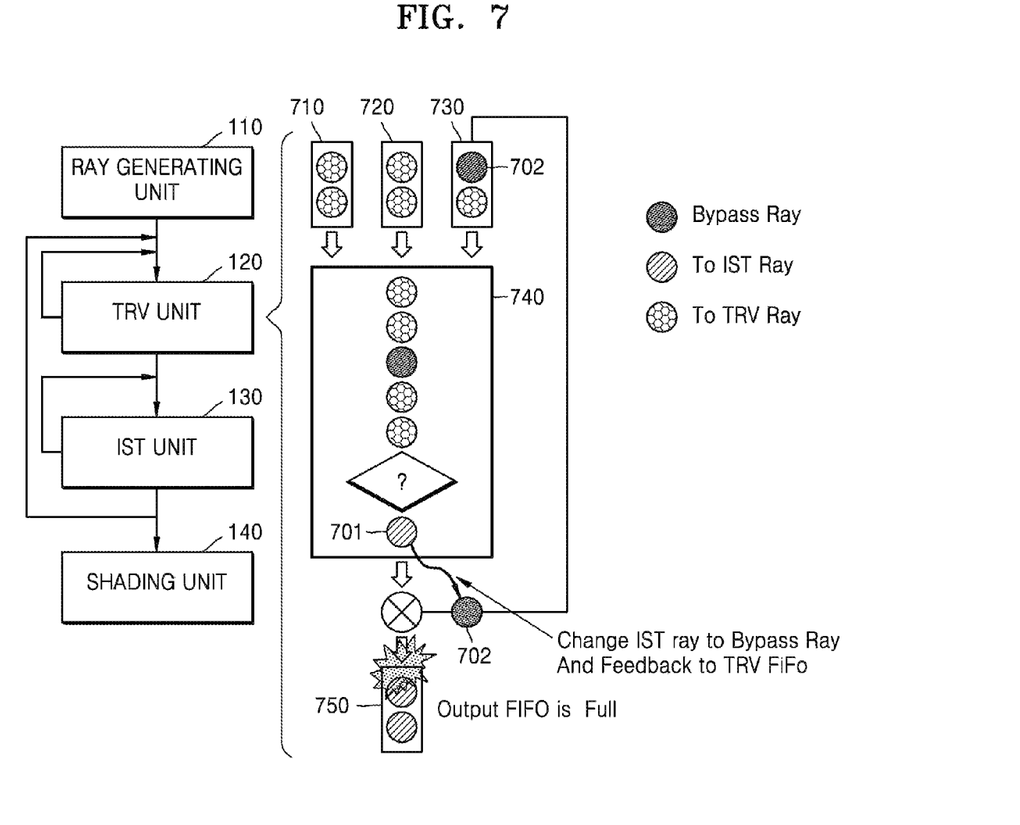
FIG. 7 is a diagram illustrating an example of a method by which a traversal (TRV) unit processes ray data, according to an embodiment.

FIG. 7 is a diagram illustrating an example of a method by which a traversal (TRY) unit processes ray data. Referring to FIG. 7, the TRV unit 120 includes input buffers, namely, an IST input buffer 710, an RG input buffer 720, and a TRV input buffer 730, and a pipeline 740.

The IST input buffer 710 receives ray data from the IST unit 130, and the RG input buffer 720 receives ray data from the ray generating unit 110. The TRV input buffer 730 receives ray data from the pipeline 740 of the TRV unit 120. The TRV input buffer 730 is a feedback buffer.

The pipeline 740 receives ray data to be primarily processed based on properties of ray data stored in the input buffers, namely, the IST input buffer 710, the RG input buffer 720, and the TRV input buffer 730. The pipeline 740 receives ray data having a bypass property at a top priority. Ray data having a bypass property passes through stages of the pipeline 740 without a traversal. When ray data having a bypass property is output from the pipeline 740 and an output buffer 750 has a sufficient storage space, the pipeline 740 updates a property of ray data to an IST RAY and outputs the ray data to the output buffer 750.

The pipeline 740 performs acceleration structure traversal with respect to input ray data. The pipeline 740 includes stages, where each of the stages performs computations independently. Each of the stages of the pipeline 740 determines whether ray data hits a bounding box or an object.

Properties of ray data are expressed as bypass, IST RAY, or TRY RAY. Bypass indicates that ray data is not for traversal of an acceleration structure or an intersection test. IST RAY indicates ray data to be output to the IST unit 130. TRV RAY indicates ray data to be output to the TRV unit 120.

If ray data has a bypass property, the pipeline 740 does not perform acceleration structure traversal with respect to the ray data. In other words, in the case of ray data having a bypass property, the ray data sequentially passes through the respective stages, and the pipeline 740 does not determine whether the ray data intersects with a bounding box or an object.

The pipeline 740 changes the properties of ray data based on a result of traversal. The pipeline 740 changes a property of ray data 701, which satisfies output conditions, from TRV RAY to IST RAY. The ray data 701 having an IST RAY property is output to the output buffer 750. The output buffer 750 is one of the input buffers of the IST unit 130.

If there is insufficient space in the output buffer 750 to store ray data, the pipeline 740 outputs ray data, which is meant to be output to the output buffer 750, to the TRV input buffer 730 from among the input buffers, namely, the IST input buffer 710, the RG input buffer 720, and the TRV input buffer 730. For example, the ray data 701 is ray data having an IST RAY property. Although the ray data 701 is output to the output buffer 750, when there is insufficient space in the output buffer 750 to store the ray data 701, the pipeline 740 changes a property of the ray data 701 and outputs the ray data 701 to the TRV input buffer 730. Ray data 702 refers to the ray data 701 with changed properties.

Figure 8:
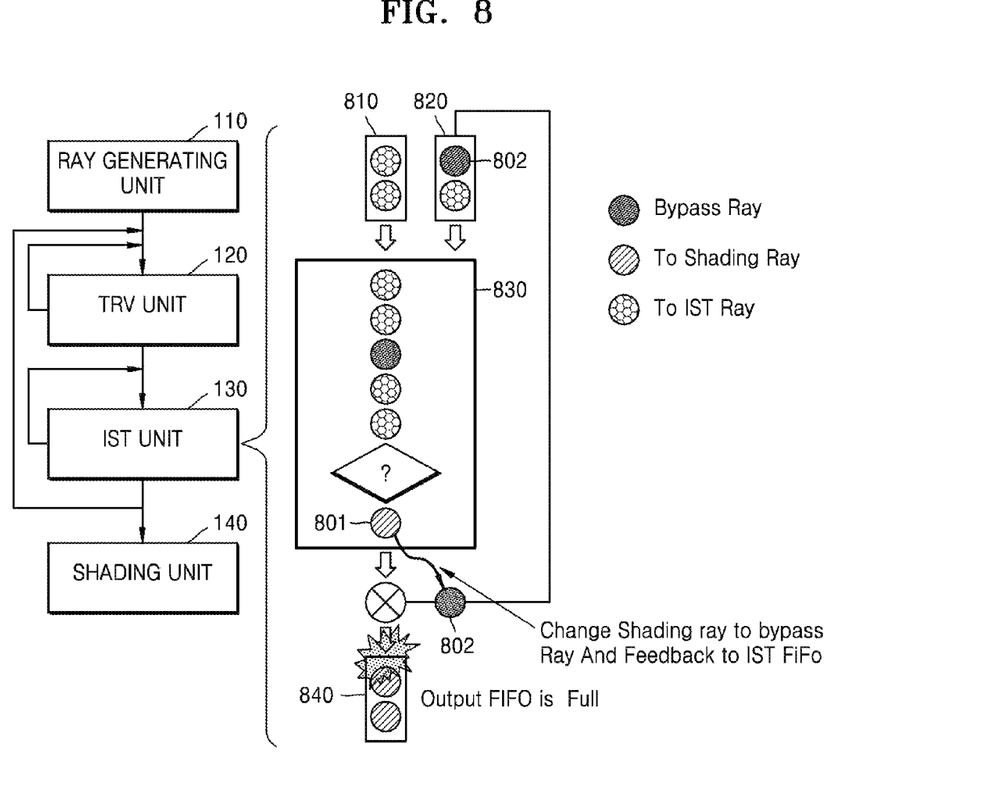
FIG. 8 is a diagram illustrating an example of a method by which an intersection (IST) unit processes ray data, according to an embodiment.

FIG. 8 is a diagram illustrating an example of a method by which an intersection (IST) unit 130 processes ray data. Referring to FIG. 8, the IST unit 130 includes input buffers, namely, a TRV input buffer 810 and an IST input buffer 820, and a pipeline 830.

The TRV input buffer 810 receives ray data from the TRV unit 120, and the IST input buffer 820 receives ray data from the pipeline 830 of the IST unit 130. The IST input buffer 820 is a feedback buffer.

The pipeline 830 receives ray data to be primarily processed based on properties of ray data stored in the input buffers, namely, the TRV input buffer 810 and the IST input buffer 820. The pipeline 830 receives ray data having a bypass property at a top priority. Ray data having a bypass property passes through stages of the pipeline 830 without a traversal. When ray data having a bypass property is output from the pipeline 830 and an output buffer 840 has a sufficient storage space, the pipeline 830 updates a property of ray data to SHADING RAY and outputs the ray data to the output buffer 840. Ray data having a SHADING RAY property is ray data to be output to the shading unit 140.

The pipeline 830 performs intersection traversal with respect to input ray data. The pipeline 830 includes stages, where each of the stages performs computations independently. Each of the stages of the pipeline 830 performs an intersection test between ray data and a primitive.

Properties of ray data processed by the IST unit 130 are expressed as bypass, IST RAY, or SHADING RAY. Bypass indicates that ray data is not for traversal of an acceleration structure or an intersection test. IST RAY indicates ray data to be fed back to the IST unit 130. SHADING RAY indicates ray data to be output to the shading unit 140.

If ray data has a bypass property, the pipeline 830 does not perform acceleration structure traversal with respect to the ray data. In other words, in the case of ray data having a bypass property, the ray data sequentially passes through the respective stages, and the pipeline 830 does not determine whether ray data and primitives intersect each other.

The pipeline 830 changes the properties of ray data based on a result of a traversal. The pipeline 830 changes a property of ray data 801, which satisfies output conditions, from IST RAY to TRV RAY or SHADING RAY. The ray data 801 having a TRV RAY or SHADING RAY property is output to the output buffer 840. The output buffer 840 is one of the input buffers of the TRV unit 120 or the shading unit 140.

If there is insufficient space in the output buffer 840 to store ray data, the pipeline 830 outputs ray data, which is meant to be output to the output buffer 840, to the feedback buffer 820 from among the input buffers 810 through 820. For example, the ray data 801 is ray data having a SHADING RAY property. Although the ray data 801 is output to the output buffer 840, the output buffer 840 does not have sufficient space to store the ray data 801. Therefore, the pipeline 830 changes a property of the ray data 801 and outputs the ray data 801 to the IST input buffer 820. Ray data 802 denotes the ray data 801 with changed properties.

Figure 9:
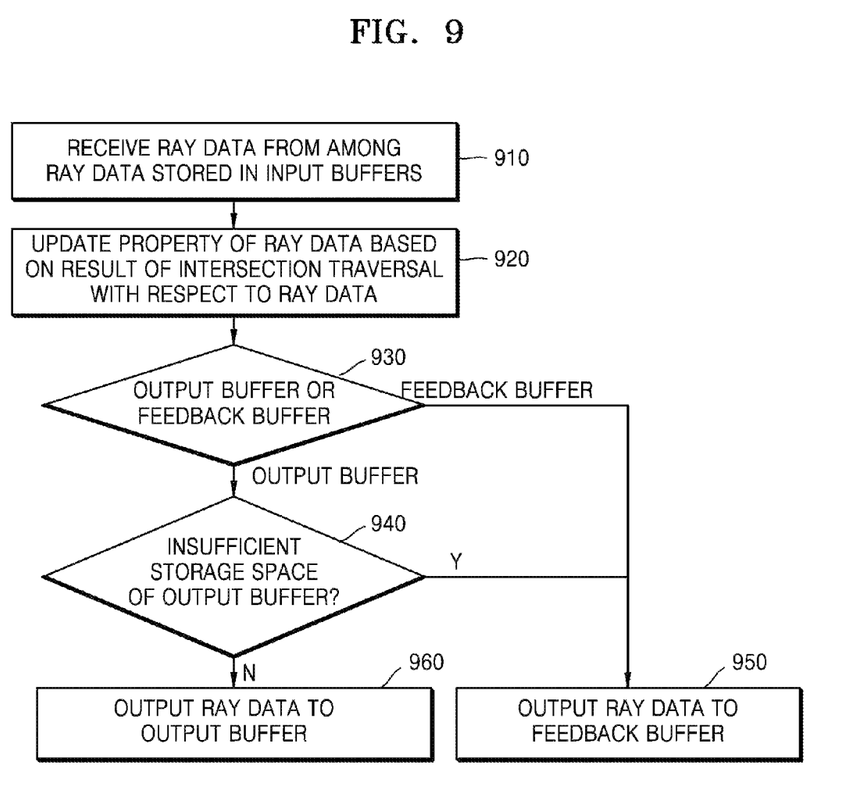
FIG. 9 is a flowchart of a method of processing ray data, according to an embodiment.

FIG. 9 is a flowchart of a method of processing ray data, according to an embodiment. Referring to FIG. 9, in operation 910, a ray tracing unit receives ray data stored in input buffers. The ray tracing unit indicates either the TRV unit 120 or the IST unit 130.

In operation 920, the ray tracing unit updates the properties of ray data based on a result of acceleration structure traversal or an intersection test with respect to the ray data.

In operation 930, the ray tracing unit determines whether to output ray data to an output buffer or a feedback buffer, based on a property of the ray data. In one example, if it is determined that the ray data is to be output to the feedback buffer, the method proceeds to operation 950. Otherwise, if it is determined that the ray data is to be output to the output buffer, the method proceeds to operation 940. For example, if the TRV unit 120 outputs ray data, the output buffer is an input buffer of the IST unit 130. Furthermore, if the IST unit 130 outputs ray data, the output buffer is an input buffer of the TRV unit 120 or the shading unit 140.

In operation 940, the ray tracing unit determines whether there is sufficient space in the output buffer to store the ray data. If there is insufficient space in the output buffer to store the ray data, the method proceeds to operation 950. Otherwise, if there is sufficient space in the output buffer to store the ray data, the method proceeds to operation 960.

In operation 950, the ray tracing unit outputs the ray data to the feedback buffer.

In operation 960, the ray tracing unit outputs the ray data to the output buffer.

Accordingly, by using the pipeline as a buffer, the ray tracing unit is prevented from being stalled.

Figure 10:
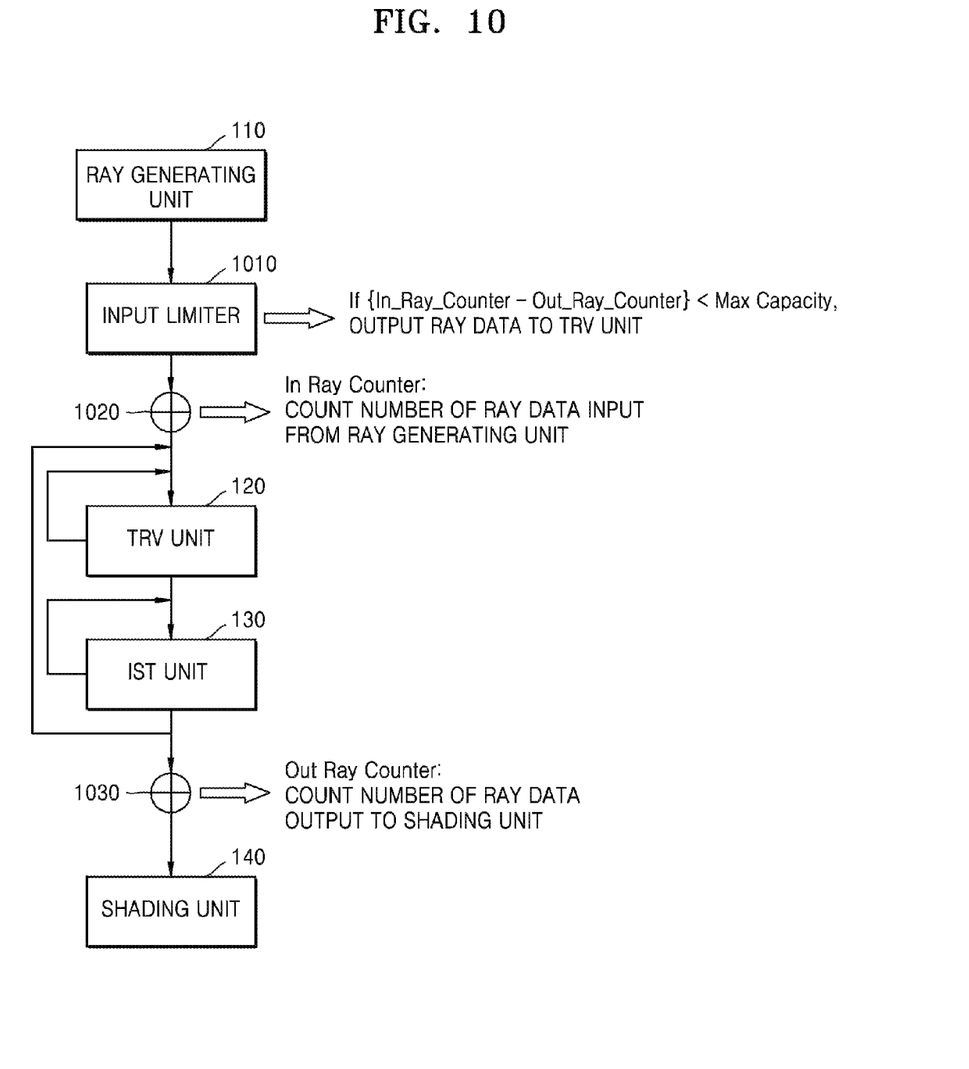
FIG. 10 is a diagram illustrating an example of a ray tracing core according to another embodiment; and, FIG. 11 is a flowchart of a method of managing flow of ray data, according to an embodiment.

FIG. 10 is a diagram illustrating an example of a ray tracing core 100 according to another embodiment.

Referring to FIG. 10, the ray tracing core 100 includes an input limiter 1010, an in-ray counter 1020, and an out-ray counter 1030.

The in-ray counter 1020 counts the number of ray data input to the TRV unit 120. The in-ray counter 1020 outputs a count result to the input limiter 1010.

The out-ray counter 1030 counts the number of ray data output from the IST unit 130. The out-ray counter 1030 outputs a count result to the input limiter 1010.

The input limiter 1010 controls ray data output from the ray generating unit 110 to the TRV unit 120. The input limiter 1010 receives count results from the in-ray counter 1020 and the out-ray counter 1030 and calculates the number of ray data being processed by the TRV unit 120 and the IST unit 130. The input limiter 1010 calculates the number of ray data being processed by the TRV unit 120 and the IST unit 130 by calculating a difference between the number of ray data counted by the in-ray counter 1020 and the number of ray data counted by the out-ray counter 1030.

If the number of ray data being processed does not exceed a maximum number of ray data, the input limiter 1010 outputs ray data from the input limiter 1010 to the TRV unit 120.

The input limiter 1010 sets the maximum number of ray data based on the total number of stages of the TRV unit 120 and the IST unit 130 and the number of ray data stored by feedback buffers of the TRV unit 120 and the IST unit 130. For example, as shown below in Equation 1, the input limiter 1010 sets a number obtained by subtracting 1 from the sum of the total number of stages of the TRV unit 120 and the IST unit 130 and the number of ray data stored by feedback buffers of the TRV unit 120 and the IST unit 130 as the maximum number of ray data. Although 1 is subtracted from a sum of the total number of stages and the number of ray data in Equation 1, a natural number greater than 1 may also be subtracted therefrom.

The maximum number of ray data=(the total number of stages of the TRV unit 120 and the IST unit 130)+(the number of ray data stored by feedback buffers of the TRV unit 120 and the IST unit 130)−1    Equation 1

Figure 11:
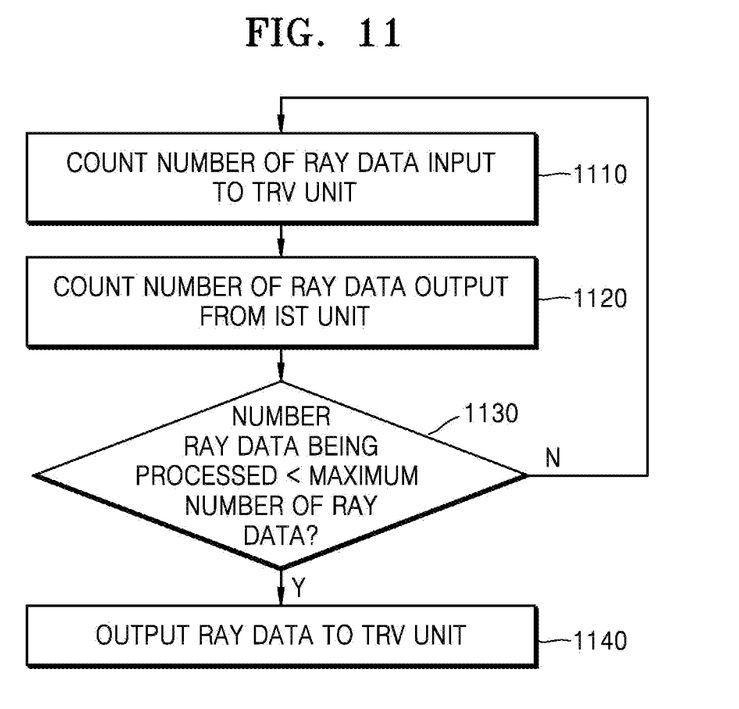

FIG. 11 is a flowchart of a method of managing flow of ray data, according to an embodiment.

Referring to FIG. 11, the ray tracing core 100 controls ray data input to the TRV unit 120 to prevent deadlocks.

In operation 1110, the ray tracing core 100 counts the number of ray data input to the TRV unit 120.

In operation 1120, the ray tracing core 100 counts the number of ray data output from the IST unit 130. The ray data output from the IST unit 130 is not ray data to be fed back to the IST unit 130 or the TRV unit 120 and is ray data output to the shading unit 140.

In operation 1130, the ray tracing core 100 compares the number of ray data being processed to the maximum number of ray data. If the number of ray data being processed is less than the maximum number of ray data, the method proceeds to operation 1140. Otherwise, the method proceeds back to operation 1110. The ray tracing core 100 determines the number of ray data being processed by the TRV unit 120 and the IST unit 130 by using the count results from operations 1110 and 1120. In other words, the ray tracing core 100 counts the number of ray data being processed by subtracting the number of ray data output from the IST unit 130 to the shading unit 140 from the number of ray data input from the ray generating unit 110 to the TRV unit 120.

If the number of ray data being processed is less than the maximum number of ray data, a deadlock will not occur even if the TRV unit 120 and the IST unit 130 receive additional ray data, and thus, the input limiter 1010 outputs ray data to the TRV unit 120. However, if the number of ray data being processed is equal to or greater than the maximum number of ray data, a deadlock may occur, and thus, the input limiter 1010 limits ray data output to the TRV unit 120.

In operation 1140, the ray tracing core 100 outputs ray data from the ray generating unit 110 to the TRV unit 120.

The ray tracing core 100 controls flow of ray data to prevent deadlocks, which refers to interruption of operations of the TRV unit 120 and the IST unit 130, by limiting the number of ray data for acceleration structure traversals and intersection tests.

As described above, according to the one or more of the above embodiments, a ray tracing unit uses a pipeline as a buffer if there is insufficient space in an output buffer.

As described above, according to the one or more of the above embodiments, a ray tracing core controls the number of ray data processed by a ray tracing unit.

In addition, other embodiments can also be implemented through computer-readable code/instructions in/on a medium, e.g., a non-transitory computer-readable recording medium, to control at least one processing element to implement any above described embodiment. The non-transitory computer-readable recording medium can correspond to any medium/media permitting the storage and/or transmission of the computer-readable code.

The computer-readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs).

What is claimed is:

1. A method of processing ray data, the method comprising:
   receiving the ray data stored in input buffers;
   updating a property of the ray data based on a result of an intersection traversal of the ray data; and
   outputting the ray data to an output buffer or a feedback buffer from among the input buffers based on the updated property of the ray data,
   wherein, in the outputting of the ray data, in response to insufficient space in the output buffer to store the ray data, the property of the ray data to be output to the output buffer is updated to a bypass property and the ray data to be output to the output buffer is output to the feedback buffer,
   wherein when the ray data received from the input buffers includes the bypass property, the intersection traversal is not performed and the ray data passes through stages of a pipeline, and
   wherein the method of processing ray data further comprising:
   determining whether the output buffer is able to store the ray data having the bypass property; and
   upon determining that the output buffer is able to store the ray data having the bypass property, updating the property of the ray data from the bypass property to a property indicating the output buffer.

2. The method of claim 1, wherein, in the receiving of the ray data, the ray data to be processed at a high priority is received based on properties of the ray data stored in the input buffers.

3. The method of claim 2, wherein, in the receiving of the ray data, the ray data having a bypass property is received at a highest priority from among the ray data stored in the input buffers.

4. The method of claim 1, wherein the property of the ray data indicates a buffer to receive the ray data.

5. The method of claim 1, wherein the feedback buffer is an input buffer from among the input buffers.

6. A non-transitory computer-readable recording medium having recorded thereon a computer program for implementing the method of claim 1.

7. A ray tracing unit comprising:
   input buffers, configured to categorize and store ray data output by units; and
   a pipeline, configured to perform intersection traversal with respect to the ray data received from the input buffers and to update a property of the ray data based on a result of the intersection traversal,
   wherein, in response to insufficient space in an output buffer to store the ray data, the pipeline updates the property of the ray data to be output to the output buffer to a bypass property and outputs the ray data to a feedback buffer,
   wherein the pipeline does not perform intersection traversal with respect to the ray data having the bypass property and the ray data passes through stages of the pipeline, and
   wherein the pipeline is further configured to:
   determine whether the output buffer is able to store the ray data having the bypass property; and
   upon determining that the output buffer is able to store the ray data having the bypass property, update the property of the ray data from the bypass property to a property indicating the output buffer.

8. The ray tracing unit of claim 7, wherein the pipeline receives the ray data to be processed at a high priority based on properties of the ray data stored in the input buffers.

9. The ray tracing unit of claim 8, wherein the pipeline receives the ray data having the bypass property at a highest priority from among the ray data stored in the input buffers.

10. A method of processing ray data, the method comprising:
    receiving the ray data from input buffers;
    determining whether an output buffer includes sufficient storage space to store the ray data;
    updating a property of the received ray data based on the determining and on a result of intersection traversal of the ray data;
    wherein, in the outputting of the ray data, in response to insufficient space in the output buffer to store the ray data, the property of the ray data to be output to the output buffer is updated to a bypass property and the ray data to be output to the output buffer is output to the feedback buffer,
    wherein when the ray data received from the input buffers includes the bypass property, the intersection traversal is not performed and the ray data passes through stages of a pipeline, and
    wherein the method of processing ray data further comprising:
    determining whether the output buffer is able to store the ray data having the bypass property; and
    upon determining that the output buffer is able to store the ray data having the bypass property, updating the property of the ray data from the bypass property to a property indicating the output buffer.

11. The method of claim 10, wherein
    the ray data is output to the output buffer upon determining that the output buffer includes sufficient storage space to store the ray data.

* * * * *